INVENTOR.
Herman W. Driehaus
BY
Murray G. Gleeson
ATTORNEY

INVENTOR.
Herman W. Driehaus
BY
Murray A. Gleeson
ATTORNEY

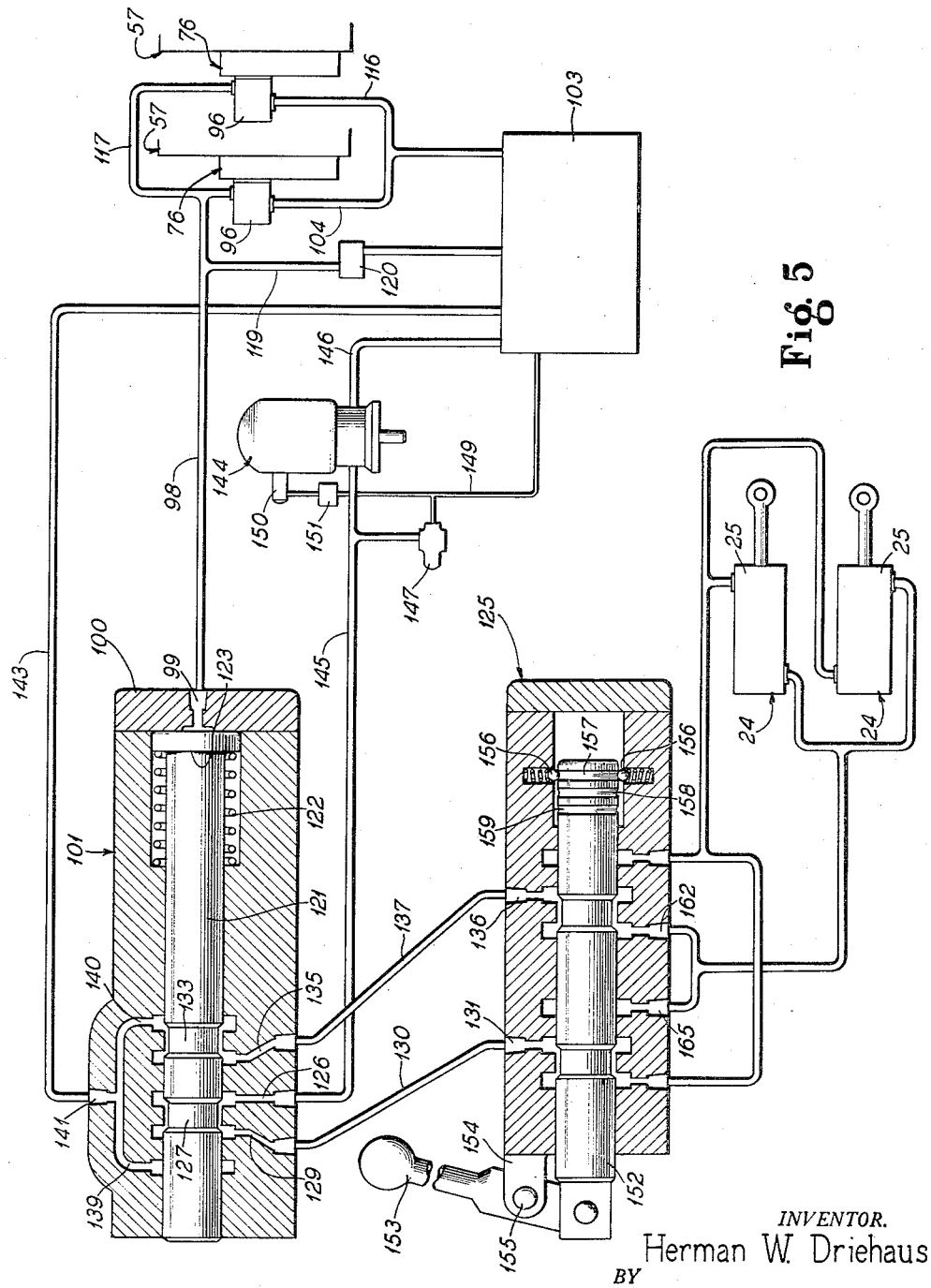

United States Patent Office 2,841,379
Patented July 1, 1958

2,841,379

MINING APPARATUS AND AUTOMATIC FEED CONTROL THEREFOR

Herman W. Driehaus, Chicago, Ill., assignor to Goodman Manufacturing Company, Chicago, Ill., a corporation of Illinois Application December 7, 1956, Serial No. 627,002

13 Claims. (Cl. 262—19)

This invention relates to improvements in an automatic control means for controlling the feed of a machine in accordance with the load thereon.

A principal object of the invention is to provide an automatic control for the feed of a machine, such as a mining machine which is responsive to the load on the machine.

A further object of the invention is to provide an automatic control for a machine in which certain parts are driven through a preloaded clutch and in which slipping of the clutch effects the stopping and reversal of the feed to the machine.

Another object of the invention is to provide an automatic control for a mining machine and the like in which the machine is fed along the ground to perform a working operation and in which the feed is automatically stopped and then reversed responsive to the pressure generated by relative movement of the driving and driven parts of a clutch in the drive effecting the working operation.

A further object of the invention is to provide an automatic control for mining machines and the like, in which the machine is fed along the ground to perform a working operation, and in which the drive to perform the working operation is effected through a friction clutch in which relative movement between the driving and driven parts of the clutch drive a pump to generate pressure to stop and then reverse the feed of the machine in accordance with slipping of the clutch and the load on the machine.

A still further object of the invention is to provide an automatic control for a mining machine and the like having a cutting element driven through a slipping clutch and having feeding means for feeding the cutting element into the working face of a mine, in which the driving and driven parts of the clutch serve to drive the rotors of a pump upon relative movement of the driving and driven parts of the clutch, effected by the slipping of the clutch, and in which the pump generates pressure to control the feeding mechanism of the machine to first stop the machine on predetermined overload conditions and then reverse the machine upon continuation of the overload conditions.

These and other objects of the invention will appear from time to time as the following specification proceeds and with reference to the accompanying drawings wherein.

Figure 4:
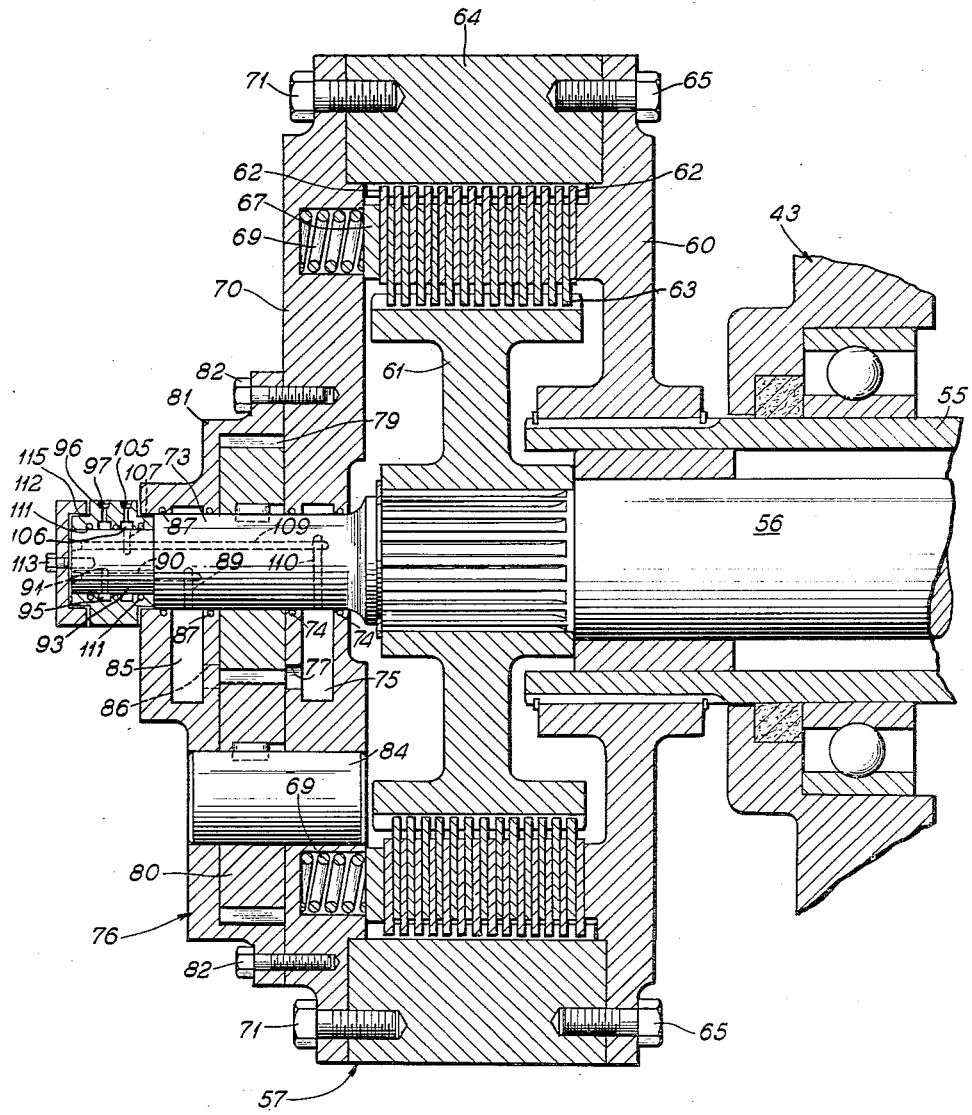

Figure 4 is an enlarged longitudinal sectional view taken through the clutch for driving one of the cutting devices and showing the pump operated by relative movement between the driving and driven parts of the clutch; and Figure 5 is a fluid circuit diagram illustrating the control mechanism for controlling feeding of the cutting elements and having the automatic control of the invention embodied therein, for stopping and reversing feeding upon slipping of the drive clutches for either or both of the cutting devices.

In the embodiment of the invention illustrated in the drawings, I have shown for illustrative purposes a mining machine 10 of a type which may cut and load from the working face of a mine by arcuate movement of a cutting element 11, supported on and projecting forwardly of a turret or turntable 12, rotatably carried at a forward end of a main frame 13 for the machine. The turntable 12 is mounted on the main frame 13 for movement about a vertical axis adjacent the forward end of said main frame and spaced forwardly of continuous traction tread devices 15, supporting and propelling the machine along the ground from working place to working place. The traction tread devices are driven from individual motors 16 at the rear end of the main frame through suitable speed reducers of types commonly used to drive the continuous traction tread devices of mining machines, to propel the machine from working place to working place and to feed the cutting mechanism therefor into a working face, and form no part of the present invention so not herein shown or described further.

A conveyor 17 is shown as extending along the main frame 13 from a position adjacent the forward end of said main frame for discharging the mined material into a conveyor or like device, for carrying the mined material away from the machine.

The conveyor 17 is shown as being a center strand chain and flight type of conveyor, which is laterally flexible to accommodate lateral swinging movement of an overhanging discharge end portion 19 of the conveyor by the operation of hydraulic swing jacks 20.

An inclined elevating conveyor 21 extends forwardly of the main frame 13 and is pivotally supported in cascade relation with respect to the receiving end of the conveyor 17 for vertical movement about a transverse axis on a laterally swingable frame 22 secured to and extending upwardly from the turntable 12, and laterally movable with the cutting element 11, upon lateral swinging movement thereof.

The conveyor 21 is provided with gathering devices 23 at its forward end, for picking up the mined coal from the ground and loading it upon the elevating conveyor 21 in a manner well known to those skilled in the art, and no part of the present invention, so not herein shown or described further.

A pair of laterally spaced hydraulic jacks 24 are provided to swing the swingable frame 22, cutting element 11 and elevating conveyor 21 laterally with respect to the main frame 13. The jacks 24 are herein shown as comprising cylinders 25 trunnioned adjacent their rear ends on the main frame 13, for movement with respect thereto about parallel vertical axes, on trunnion supports 26, and having piston rods 27 extensible with respect thereto. The piston rods 27 are shown as being pivotally connected to the swinging frame 22 on opposite sides of the receiving end of the conveyor 17 on vertical pivot pins 28, for swinging the swinging frame 22 and turntable 12 about the axis of swinging movement thereof and providing a force to feed the cutting element 11 and gathering devices 23 across the working face of a mine, to effect a continuous cutting and loading operation.

Figure 2:
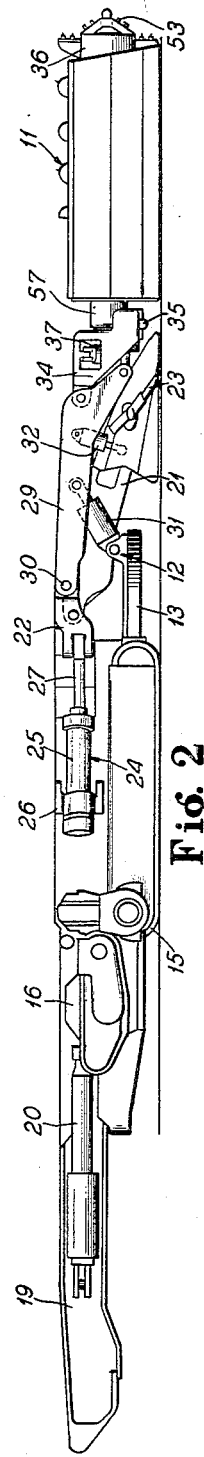
Figure 2 is a view in side elevation of the machine shown in Figure 1.

The laterally swingable frame 22 has an elevating frame 29 transversely pivoted thereto beyond the forward end of the main frame 13 and extending forwardly therefrom and forming a means for elevating the cutting element 11 with respect to the ground. The elevating frame 29 is shown as being pivotally connected to the laterally swingable frame 22 on coaxial pivot shafts 30 and as being vertically moved about the axes of the pivot shafts 30 by hydraulic jacks 31, pivotally connected between the forward end portion of the turntable 12 and the elevating frame 29, as shown in Figure 2. The inclined elevating conveyor 21 and gathering devices 23 are elevated by hydraulic jacks 32, connected between opposite sides of the elevating frame 29 and the frame for the inclined elevating conveyor 21.

The cutting element 11 extends forwardly of and is supported on the elevating frame 29 on a roll-over frame 33 pivotally mounted on a leveling frame 34 for movement about an axis extending longitudinally of the elevating frame 29. The leveling frame 34 is transversely pivoted to the elevating frame 29, adjacent the upper end thereof and extends forwardly therefrom and is adjustably moved about its axis of pivotal connection to the leveling frame 29, as by hydraulic jacks 35 pivotally connected between the lower end portion of the elevating frame 29 and the lower forward end portion of the leveling frame 34.

The roll-over frame 33 accommodates adjustable movement of the cutting element 11 about a horizontal axis extending longitudinally of and disposed between spaced side cutting augers 36 of the cutting element 11, to adjust the side cutting augers 36 to entirely cut out seams of varying heights, one side cutting auger 36 cutting along the roof and the other auger 36 cutting along the floor where the thickness of the seam is greater than the diameters of the cutting augers. A suitable hydraulic jack 37 is provided to turn the roll-over frame 33 with respect to the leveling frame 34 and to maintain said roll-over frame in its various adjusted positions.

Figure 3:
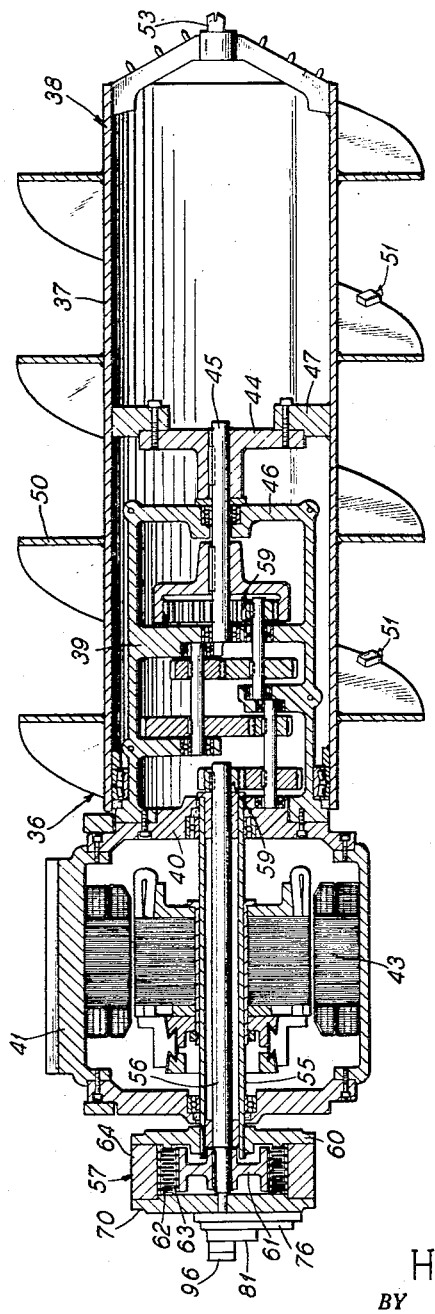
Figure 3 is a longitudinal sectional view taken substantially along line III—III of Figure 1 and showing the drive to one of the cutting devices of the machine.

Referring now to Figures 3 and 4, the cutting augers 36 and the drives thereto are of a similar construction so the same part numbers will be applied to each cutting auger and drive, and one cutting auger only need herein be shown or described in detail.

Each cutting auger 36 comprises a drum 38 journaled for rotation about a cylindrical housing 39 extending from an end plate 40 of a casing 41 for a drive motor 43. The drum 38 is supported at its forward end on a splined drive member 44 mounted on the end of a drive shaft 45, journaled in and projecting forwardly of an end wall 46 of the housing 39. The splined drive member 44 is shown as having supporting and driving engagement with an annular flange 47 extending inwardly from the forward end portion of the drum 38 of the auger 36.

The drum 38 has a spiral 50 extending therealong having cutter bits 51 projecting outwardly therefrom. The auger 36 also has a pilot bit and cutters 53 projecting forwardly of the forward end thereof.

The motor 43 is shown as having a hollow motor shaft 55 having a drive shaft 56 suitably journalled therein and extending beyond opposite ends thereof. The drive shaft 56 is driven from said motor shaft through a friction clutch 57 having a driving member 60 splined to the rear end portion of the hollow motor shaft 55. The shaft 56 has driving connection with the shaft 45 and splined drive member 44 through a reduction gear train indicated generally by reference character 59 and journaled within the housing 39.

Referring now in particular to the automatic control of the invention, controlling feeding movement of the augers 36 and stopping and reversing the direction of feed of said augers upon overload conditions, which may be caused by rock, sulphur balls and the like in the coal seam, and which may completely stall the augers 36 at times, the clutch 57 includes the driving member 60 splined on the rear end of the hollow motor shaft 55 and a driven member 61 splined on the rear end of the drive shaft 56 and driven by said driving member by alternately arranged internally and externally splined friction discs 62 and 63.

The externally splined friction discs 62 are shown as being splined within a ring 64 forming a part of the driving member 60 and secured thereto as by cap screws 65.

The internally splined friction discs 63 are shown as having splined driving engagement with the driven member 61 of the clutch, for driving the driven member 61 at the speed of the driving member 60 upon normal torque conditions.

The friction discs 62 and 63 are maintained in driving engagement with each other by an annular ring 67, shown in Figure 3 as engaging the outer externally splined friction disc 62 and maintained in engagement therewith by a plurality of compression springs 69, loaded to accommodate the discs 62 and 63 to slip with respect to each other upon predetermined torque loads on the shaft 56. The springs 69 are shown as being seated in an end plate 70 for the clutch secured to the outer end of the ring 64 as by cap screws 71. The end plate 70 is rotatable about a reduced diameter portion 73 of the shaft 56, and is sealed thereto as by spaced seals 74 on opposite sides of a cavity 75 in said end plate.

The cavity 75 forms an inlet passageway for a pump 76 through a port 77 leading to the meshing teeth of gears 78 and 80 of the pump. The gears 79 and 80 are shown as being enclosed by a housing 81 for the pump, secured to the end plate 70 of the clutch 57 as by cap screws 82. The gear 79 is keyed or otherwise secured to the reduced diameter portion 73 of the shaft 56 while the gear 80 is keyed or otherwise secured to a shaft 84 journaled at one end in the end plate 70 and at its opposite end in the end wall of the housing 81.

Thus, when the motor 43 is driving the shaft 56 through the clutch 57 and there is no slippage of the clutch, the gears 79 and 80 will rotate with the end plate 70 as a unit, and there will be no pumping action. When, however, the clutch slips as when the auger 36 may stall, the pump housing 81, shaft 84 and gear 80 will rotate about the gear 79 to effect the driving of the pump 76 as an ordinary gear pump.

The pump housing 81 has an outlet cavity 85 therein communicating with the space between the meshing teeth of the gears 79 and 80 through a port 86. Annular seals 87 on each side of the cavity 85 are provided to seal said housing to the shaft 73. The outlet cavity 85 has communication with a cross drilled passageway 89 drilled into the reduced diameter portion 73 of the shaft 56. The cross drilled passageway communicates with a drilled passageway 90 drilled into the shaft 56 from the end thereof and having communication with a cross drilled passageway 91 in a reduced diameter end portion 93 of the shaft 56. The cross drilled passageway 91 leads to an annular internal passageway 95 in a coupling collar 96, mounted on the reduced diameter portion 93 of the shaft 56, and suitably journaled thereon to accommodate rotatable movement of the shaft 56 with respect to the coupling collar 96. An outlet pressure passageway 97 leads from the coupling collar 96 for connection with a pressure line 98, for supplying fluid under pressure through a port 99 leading through an end cap 100 of a shuttle valve 101.

Fluid enters the pump 76 from a fluid storage tank 103, through a pressure line 104 connected with an inlet passageway 105 leading radially inwardly of the coupling collar 96 and having communication with an annular passageway 106 therein opening to the reduced diameter end portion 93 of the shaft 56. The annular passageway 106 has communication with a radial passageway 107 leading to a longitudinal extending drilled passageway 109 drilled inwardly from the end of the shaft 56 parallel to the passageway 90 and communicating with the passageway 75 through a cross drilled passageway 110. The annular passageways 95 and 106 are sealed from each other by suitable sealing means such as O-ring seals, indicated generally by a reference character 111.

The coupling collar 96 is retained to the reduced diameter end portion of the shaft 93 by an end cap 112, secured to the end of the shaft 56 as by a machine screw 113. The end cap 112 extends over the end and downwardly along opposite sides of the coupling collar 96 along an annular shouldered or recessed portion 115 thereof and is suitably sealed thereto.

The coupling collar 96 for the pump 76 associated with the drive to the second side cutting auger 36 is connected with the tank 103 through an inlet line 116. Said coupling collar is also connected with the pressure line 98 through a pressure line 117. Fluid under pressure is by-passed back to tank 103 from the pressure lines 98 and 117 through a by-pass line 119 having a pressure relief valve 120 therein controlling the pressure in the pressure lines 98 and 117.

The shuttle valve 101 is shown as being a well known form of spool valve having a valve spool 121. A spring 122 seated in the body for the valve and engaging a flanged end portion 123 of the spool is provided to normally bias the spool in the position shown in Figure 6, to supply fluid under pressure to a control valve 125 from an inlet port 126 of the valve 101 past a reduced diameter portion 127 of the spool 121 and through an outlet port 129 of the valve 101 through a pressure line 130 connected with an inlet port 131 of the control valve 125. The valve spool 121 of the shuttle valve 101 also has a reduced diameter portion 133 spaced inwardly or to the right of the reduced diameter portion 127. The application of fluid under pressure through the pressure line 98 and port 99 to the end of the valve spool 121 will move said valve spool into position to afford a passageway from the inlet port 126 past the reduced diameter portion 133 of the valve spool 121 out through an outlet port 135 to an inlet port 136 of the control valves 125 through a pressure line 137. The shuttle valve 101 also has spaced outlet ports 139 and 140 leading from the spool 121 and having communication with a common outlet port 141 connected with the tank 103 through a return line 143.

The inlet port 126 of the shuttle valve 101 is connected with a source of fluid under pressure such as a variable pressure pump 144 through a pressure line 145. The pump 144 is connected with the tank 103 through an inlet line 146.

A pressure relief valve 147 is shown as controlling the return of pressure from the pressure line 145 to the tank 103 through a return line 149 upon excess pressure conditions, as when the spool for the valve 101 has been moved into a position to block the supply of fluid to either of the pressure lines 100 or 137. The pump is also shown as having a volume regulating device 150 connected with the return line 149 under the control of a pressure reducing valve 151, as is common with such types of pumps, and no part of the present invention so not herein shown or described further.

The control valve 125 has a valve spool 152 shown as extending outside of the body of the valve and as having an operating lever 153 pivotally connected to the outer end thereof. The operating lever 153 is shown as being pivoted to the body of the valve 125 on a lug 154 by means of a pivot pin 155 extending through said lever and lug. The operating handle 153 may move the valve spool 152 into three positions determined by spring pressed detents 156 engageable with either one of three spaced annular grooves 157, 158 or 159 extending about said valve spool.

Figure 1:
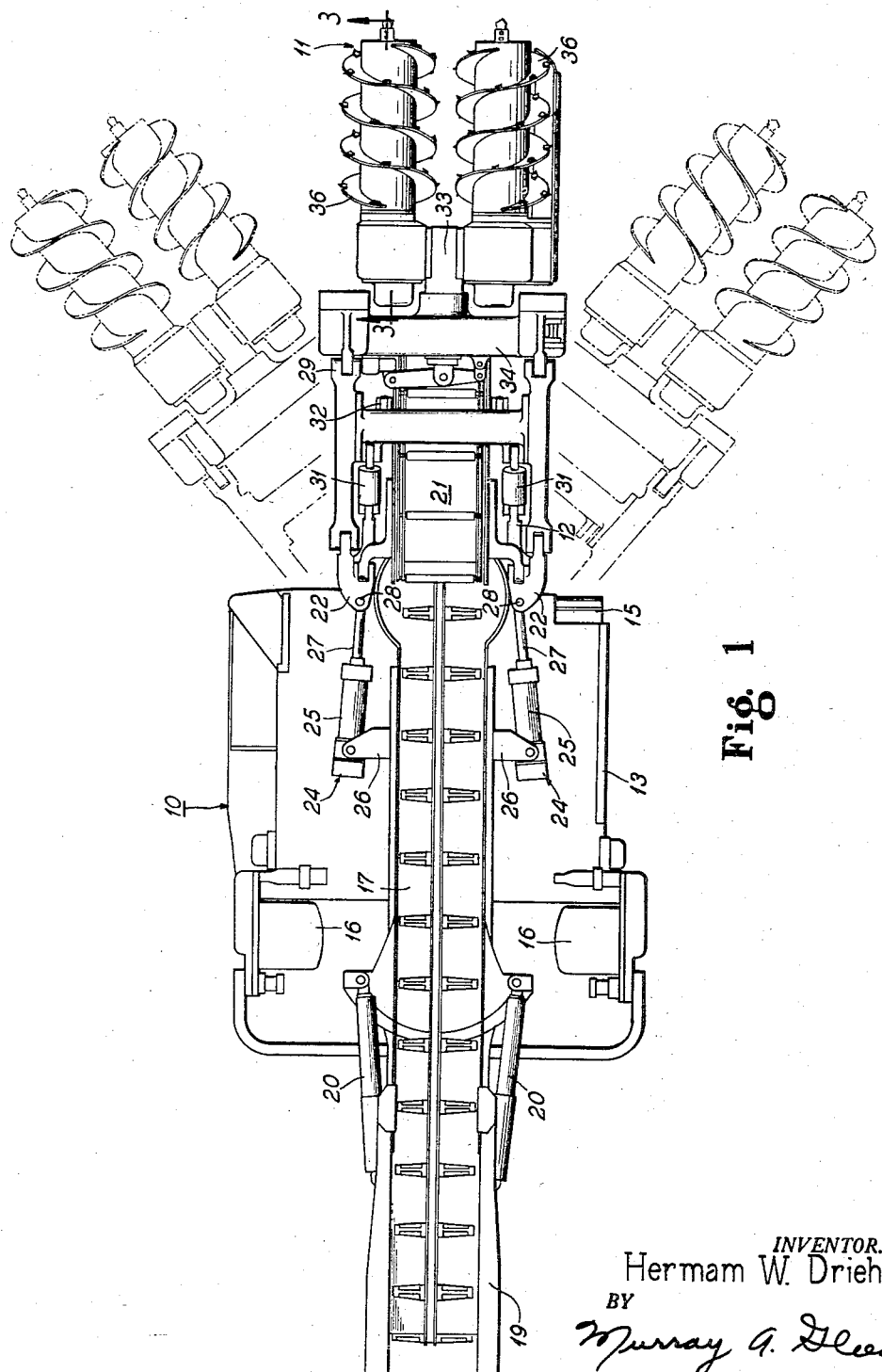
Figure 1 is a plan view of a continuous mining machine illustrating one form of machine in which the invention may be embodied.

In the position shown in Figure 5 the detents 156 are in engagement with the groove 157. In this position, the valve spool is in its automatic position and pressure entering the valve body through the pressure line 130 will supply fluid under pressure to the cylinders 24 to move the cutting element 11 in a feeding direction, which in Figure 1 is shown as being from right to left. When the valve spool is in its automatic position, as shown in Figure 5, fluid under pressure may also be supplied through the pressure line 137 to supply fluid under pressure to the cylinders 24 and effect a reversal in the feed of the cutting element 11.

Upon the positioning of the valve spool 152 in a direction to engage the detents 156 with the groove 158, the ports 131 and 136 will be closed and pressure will be held in the cylinders 25. The valve spool 152 will then be in its stop position and the cutting element 11 will be held from lateral movement with respect to the main frame 13.

Upon movement of the control lever 153 in a direction to move the valve spool 152 to the right to engage the detents 156 with the annular groove 159, the valve spool 152 will accommodate the passage of fluid under pressure to the cylinders 25 through a port 165 and line 161 to operate the hydraulic jacks in a direction to move the cutting element 11 to the right.

In operation of the machine, the cutting element 11 is first swung to the right by movement of the control handle 153 in a direction to engage the detents 156 with the groove 159 and effect the admission of fluid under pressure to the head end of the cylinder 25 on the left hand side of the machine, and to the piston rod end of the cylinder 25 on the right hand side of the machine. Power may then be applied to the continuous traction tread devices 15 to feed the cutting element into the working face, it being understood that during the feeding operation, the two augers 36 are rotatably driven by their individual motors 43. When the cutting element 11 has been fed into the coal seam to the required depth, the operation of the continuous traction tread devices is stopped. The valve spool 152 may then be moved to its automatic position shown in Figure 5 with the detents 156 in engagement with the groove 157. Fluid under pressure will then be supplied through the port 126 of the shuttle valve 101 and out the port 129 of said shuttle valve through the pressure line 130, to supply fluid under pressure to the control valve 125 to effect the supply of fluid under pressure to the head end of the right hand cylinder 24 and the piston rod end of the left hand cylinder 24. The two side cutting augers 36 will then be moved laterally across the face by the pressure supplied by the pump 144.

During lateral feeding movement of the side cutting augers 36 across the coal face, if the cutting is uniform, the two clutches 57 will be engaged and the pumps 76 will rotate therewith as a unit and will be ineffective to supply fluid under pressure to the pressure line 98 to shift the valve spool 121 of the shuttle valve 101. Feeding of the side cutting augers 36 will thus continue until an excessive load is encountered, causing slipping of either of the clutches 57. As slippage occurs, the pump associated with the slipping clutch will become effective to supply fluid under pressure to the pressure line 98 and port 99 to move the valve spool 121 to the left against its biasing spring 122. This will first move the spool 121 into position to block the supply of fluid to the valve 101 through the port 126 and will thus block the supply of fluid to the pressure line 130 and stop the feeding operation.

As either or both of the clutches 57 continue to slip, pressure will build up in the pressure line 98 and continue movement to the valve spool 121 to the left and connect the port 129 and pressure line 130 with the return ports 139 and 141. It will also connect the inlet port 126 with the port 135 and effect the supply of fluid under pressure through the port 135 and pressure line 137 to the port 136 of the control valve 125. This will supply fluid under pressure through the port 162 of said control valve to the piston rod end of the right hand cylinder 24 and the head end of the left hand cylinder 24 and reverse the direction of travel of the side cutting augers 36 along the coal face until the load has been relieved. Said side cutting augers will then again be rotatably driven through their motors 43 and clutches 57. When the clutches no longer slip, the spring 122 will move the valve spool 121 back in the position shown in Figure 5 and fluid under pressure will again be supplied to the control valve 125 through the pressure line 130 and to the head end of the right hand cylinder, and the piston rod end of the left hand cylinder to continue the feed to the left.

It may be seen from the foregoing that a simplified form of automatic control, controlling the feeding of a cutting element, has been provided which is dependent upon the slipping of the clutch driving the cutting element and the building up of pressure by pumping means driven by relative movement between the driving and driven members of the clutch, and that this drive connection first stops the cutting operation upon the encountering of torque loads sufficient to cause slipping of the clutch, and then reverses the direction of the feed to free the cutting element from the condition causing overload and accommodates the cutting element to continue its cutting operation as the overload conditions are remedied.

It may further be seen that while the automatic control of the invention is shown as controlling the operation of a side cutting machine and the supply of fluid under pressure through the jacks for feeding the cutting element sideways, that it may be applied to a front cutting machine to control operation of feeding mechanism, such as traction tread devices feeding the machine directly into the working face, as well, and may be applied to any working operation in which the drive is through a coupling having parts moving relatively with respect to each other upon overload conditions.

It will be understood that while I have herein shown or described one form in which the invention may be embodied, that various modifications and variations thereof may be effected without departing from the spirit and scope of the novel concepts thereof.

I claim as my invention:

1. In an apparatus of the class described, a cutting mechanism, drive means for said cutting mechanism including a motor and driving and driven members driven thereby and relatively movable with respect to each other upon overload of said cutting mechanism, a pump associated with said driving and driven members and driven upon relative movement between said members to generate fluid pressure, feeding mechanism for feeding said cutting mechanism to effect a cutting operation, drive means for said feeding mechanism, fluid pressure operated control means for said drive means, and a fluid pressure connection from said pump to said control means, for operating said control means to reverse the direction of feeding movement of said feeding mechanism upon relative movement of said driving and driven parts with respect to each other, effected by overload of said cutting mechanism.

2. In an apparatus of the class described, a motor, work performing means driven by said motor, feeding mechanism to progress said work performing means to effect a working operation, the drive from said motor to said work performing means comprising a clutch loaded to slip at a predetermined torque load, a pump associated with said clutch and driven thereby only upon slipping thereof, control means for controlling operation of said feeding mechanism, and fluid pressure means operated by said pump for supplying pressure to said control means to operate said control means to reverse said feeding mechanism upon the slipping of said clutch.

3. In a mining apparatus, a main frame, cutting mechanism carried by said main frame, a motor on said main frame for driving said cutting mechanism, the drive from said motor to said cutting mechanism including a friction clutch loaded to slip at a predetermined torque load, a pump associated with said clutch and driven by said clutch upon relative movement of the parts of said clutch upon slipping thereof, feeding mechanism for said cutting mechanism, control means for said feeding mechanism including a shuttle valve operated by the pressure generated by said pump to stop said feeding mechanism upon slipping of said clutch and to reverse said feeding mechanism upon continued slipping thereof.

4. In a mining apparatus, a main frame, cutting mechanism carried by said main frame, a motor on said main frame, means driven by said motor for driving said cutting mechanism including a friction clutch loaded to slip at a predetermined torque load, a pump associated with said clutch and driven thereby only upon slipping thereof, feeding mechanism for said cutting mechanism, a control valve for controlling operation of said feeding mechanism, a shuttle valve connected with a source of supply of fluid under pressure for supplying fluid under pressure to said control valve to operate said feeding mechanism in a feeding direction, and movable into position to first stop and then reverse said feeding mechanism, and a fluid pressure connection from said pump to said shuttle valve for moving said shuttle valve into position to block the supply of fluid under pressure to said control valve to first stop said feeding mechanism and then to admit fluid under pressure to said control valve to effect reversal of said feeding mechanism.

5. In a mining apparatus, a frame, a motor on said frame, cutting mechanism carried by said frame, means driven by said motor for driving said cutting mechanism including a friction clutch loaded to slip upon a predetermined load and having a driving member rotatably driven by said motor and a driven member rotatably driven by said driving member, feeding mechanism for said cutting mechanism, a control for said feeding mechanism including a control valve, means operable upon slipping of said clutch to control the supply of fluid under pressure to said control valve to reverse said feeding mechanism including a pump having one member carried by said driving member and another member carried by said driven member and generating fluid pressure upon slipping of said clutch by relative movement of said driving member with respect to said driven member, a shuttle valve connected with said pump and operated by the pressure generated by said pump upon slipping of said clutch, and a fluid pressure connection from said shuttle valve to said control valve to supply fluid under pressure to said control valve to effect the reversal of said feeding mechanism by the operation of said shuttle valve by the pressure generated by said pump.

6. In a mining apparatus, a frame, a motor on said frame, cutting mechanism on said frame, means driven by said motor for driving said cutting mechanism including a friction clutch having a driving member rotatably driven by said motor and a driven member rotatably driven by said driving member and slipping upon predetermined torque loads on said driven member, a pump associated with said clutch and driven by said relative movement between said driving member and said driven member, feeding mechanism for said cutting mechanism, a control therefor including a control valve, and means operated by the pressure supplied by said pump upon the slipping of said clutch to supply fluid under pressure to said control valve to first stop and then reverse said feeding mechanism upon continued slipping of said clutch comprising a shuttle valve having a valve spool shiftable in one position to block the supply of fluid to said control valve and in a second position to supply fluid to said control valve to reverse the direction of operation of said feeding mechanism, and a fluid pressure connection between said pump and said shuttle valve for operating said shuttle valve upon slipping of said clutch.

7. In a mining apparatus, a frame, a motor on said frame, cutting mechanism on said frame, means driven by said motor for driving said cutting mechanism including a friction clutch having a driving member rotatably driven by said motor and a driven member rotatably driven by said driving member and slipping upon predetermined torque loads on said driven member, a pump associated with said clutch and driven by relative movement between said driving member and said driven member, feeding mechanism for said cutting mechanism, a control therefor including a control valve having first and second pressure inlets and having an automatic position to effect operation of said feeding mechanism in a feeding direction upon the admission of fluid under pressure to said valve through said first inlet and to effect operation of said feeding mechanism in a reverse direction upon the admission of fluid under pressure to said valve through said second inlet, a shuttle valve controlling the supply of fluid under pressure to said control valve and having a valve spool biased in position to supply fluid to said control valve through said first inlet to effect operation of said feeding mechanism in a feeding direction when said control valve is in an automatic position, and a fluid pressure connection from said pump to said valve spool for moving said valve spool into a position to supply the fluid under pressure to said control valve through said second inlet to effect operation of said feeding mechanism in a reverse direction, to reverse the direction of feed of said cutting mechanism upon stalling thereof, and to accommodate said feeding mechanism to free itself to again continue its cutting operation.

8. In a mining apparatus, a frame, a motor on said frame, cutting mechanism on said frame, means driven by said motor for driving said cutting mechanism including a friction clutch having a driving member driven by said motor and a driven member rotatably driven by said driving member and slipping upon predetermined torque loads on said driven member, a pump associated with said clutch and driven by relative movement between said driving and said driven member, feeding mechanism for said cutting mechanism including fluid pressure operated means for feeding said cutting mechanism in a feeding and a return direction, a control valve for said fluid pressure operated means, means operated by the pressure supplied by said pump upon the slipping of said clutch to supply fluid under pressure to said control valve to first stop and then reverse said feeding mechanism, comprising a shuttle valve having a valve spool shiftable in one position to block the supply of fluid to said control valve and in a second position to supply fluid to said control valve to effect the reversal of operation of said feeding mechanism, and a fluid pressure connection from said pump to said shuttle valve for moving said shuttle valve first to its one position upon overload of said cutting mechanism and then to its second position upon continued overload of said cutting mechanism.

9. In a mining apparatus, a frame, a motor on said frame, cutting mechanism on said frame, means driven by said motor for driving said cutting mechanism including a friction clutch having a driving member rotatably driven by said motor and a driven member rotatably driven by said driving member and having driving connection with said cutting mechanism, said driving and driven members slipping with respect to each other upon predetermined torque loads on said driven member, a pump associated with said driving member and said driven member and driven by relative movement between said driving member and said driven member, fluid pressure operated feeding mechanism for feeding said cutting mechanism in a cutting and reverse direction, a control valve controlling the supply of fluid under pressure to said fluid pressure operated feeding mechanism to operate said feeding mechanism and having first and second inlets and having an automatic position to effect the supply of fluid under pressure to said feeding mechanism to effect operation of said feeding mechanism in a feeding or a reverse direction in accordance with the supply of fluid under pressure to said control valve, a shuttle valve controlling the supply of fluid under pressure to said control valve and having a valve spool biased into position to supply fluid under pressure to said control valve through said first inlet to effect operation of said feeding mechanism in a feeding direction when said control valve is in an automatic position, and a fluid pressure connection from said pump to said valve spool to move said valve spool into position to supply fluid under pressure to said control valve through said second inlet, to supply fluid under pressure to said fluid pressure operated feeding mechanism to effect reversal of said feeding mechanism upon slipping of said clutch effected by stalling of said cutting mechanism.

10. In an automatic overload control device, a friction clutch having a driving member and a driven member, a pump associated with said clutch including a housing and a rotor, one being mounted on said driven member and the other being mounted on said driving member and operative to generate pressure upon slipping of said clutch and relative movement of said driving member with respect to said driven member, an operating device, valve means controlling operation of said operating device to effect operation of said device in an operating and a return direction, and a fluid pressure connection from said pump to said valve means to operate said valve means to effect the reversal of said operating device upon predetermined torque loads on said driven member effected by slipping of said clutch.

11. In an automatic overload control device, a friction clutch including a driving member and a driven member and friction discs effecting the driving of said driven member from said driving member, a pump associated with said clutch and including a housing and rotor, one being mounted on said driving member and the other being mounted on said driven member and generating pressure upon slipping of said clutch discs and relative movement between said driving member and said driven member, an operating device, a control valve controlling operation of said operating device to effect operation of said device in an operating and a return direction, a shuttle valve for supplying fluid under pressure to said control valve to effect operation of said operating device in an operating direction, and a fluid pressure connection from said pump to said shuttle valve to shift said shuttle valve to supply fluid under pressure to said control valve to effect operation of said operating device in a return direction upon slipping of said clutch.

12. In an automatic overload control device, a motor, a friction clutch driven by said motor and having a driving and a driven member, a pump including meshing rotors one on said driving member and the other on said driven member and a housing enclosing said rotors, a source of supply of fluid having fluid connection with said pump, a pressure line having fluid connection with said pump, a rotatable operating device driven by said driven member, and movable in the direction of its axis in an operating and return direction, a control valve supplying fluid under pressure to effect operation of said operating device in an operating and a return direction, a shuttle valve having a valve spool controlling the supply of fluid under pressure to said control valve and normally biased to supply fluid under pressure to said control valve to effect operation of said operating device in an operating direction, and said pressure line having fluid connection with said shuttle valve for supplying fluid under pressure to said spool to move said spool against its bias to effect the supply of fluid under pressure to said control valve to reverse the direction of said operating device upon slipping of said clutch and the generating of pressure by said pump.

13. In an automatic overload control device, a friction clutch having a driving member and a driven member, a motor having driving connection with said driving member, an operating device, a drive connection from said driven member to said operating device, a pump associated with said clutch and including a pair of meshing rotors and a housing therefor, one rotor being mounted on said driven member and the other rotor being mounted on said driving member and effecting a pumping action upon relative movement between said driving member and said driven member, fluid pressure operated feeding means for feeding said operating device in operating and return directions, a control valve controlling operation of said fluid pressure operated feeding means and having an automatic position and one inlet supplying fluid under pressure to said control valve to effect feeding in an operation direction when said valve is in its automatic position, a second inlet for supplying fluid under pressure to said control valve to effect feeding in a return direction when said valve is in its automatic position, a shuttle valve controlling the supply of fluid under pressure to said control valve including a valve spool biased in position to supply fluid under pressure to said control valve through said one inlet to effect operation of said feeding means in an operating direction when said control valve is in its automatic position, and a fluid pressure connection from said pump to said shuttle valve for moving said valve spool into position to supply fluid under pressure to said control valve through said second inlet to effect movement of said feeding means in a return direction when said control valve is in its automatic position, upon the stalling of said operating device and slipping of said clutch.

References Cited in the file of this patent

UNITED STATES PATENTS

| | | |
|---|---|---|
| 2,260,327 | McKee | Oct. 28, 1941 |
| 2,418,220 | Churchill | Apr. 1, 1947 |
| 2,562,170 | Busemeyer | July 31, 1951 |